United States Patent
Guillotel et al.

(10) Patent No.: US 10,593,027 B2
(45) Date of Patent: Mar. 17, 2020

(54) METHOD AND DEVICE FOR PROCESSING A PERIPHERAL IMAGE

(71) Applicant: THOMSON Licensing, Issy-les-Moulineaux (FR)

(72) Inventors: Philippe Guillotel, Vern sur Seiche (FR); Laura Turban, Rennes (FR); Fabrice Urban, Thorigne Fouillard (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/557,944

(22) PCT Filed: Mar. 2, 2016

(86) PCT No.: PCT/EP2016/054397
§ 371 (c)(1),
(2) Date: Sep. 13, 2017

(87) PCT Pub. No.: WO2016/146386
PCT Pub. Date: Sep. 22, 2016

(65) Prior Publication Data
US 2018/0068425 A1    Mar. 8, 2018

(30) Foreign Application Priority Data

Mar. 13, 2015 (EP) .................................... 15290071

(51) Int. Cl.
*G06T 5/00* (2006.01)
*G06T 3/40* (2006.01)
(52) U.S. Cl.
CPC ................ *G06T 5/007* (2013.01); *G06T 3/40* (2013.01); *G06T 5/001* (2013.01); *G06T 2207/20172* (2013.01)

(58) Field of Classification Search
CPC ..... G09G 2360/145; G09G 2320/0626; G09G 2360/144; G09G 2320/0693
(Continued)

(56) References Cited

U.S. PATENT DOCUMENTS 6,501,230 B1 * 12/2002 Feldman .............. G09G 3/3216
315/169.3
6,816,236 B2 * 11/2004 Otomo ................... G02B 13/22
355/67

(Continued)

FOREIGN PATENT DOCUMENTS

EP        2163102       11/2012
JP       2011138444      7/2011

(Continued)

OTHER PUBLICATIONS

Aides et al., "Multiscale Ultrawide Foveated Video Extrapolation", 2011 IEEE International Conference on Computational Photography (ICCP), Pittsburgh, Pennsylvania, USA, Apr. 8, 2011, pp. 1-8.

(Continued)

*Primary Examiner* — Yosef Kassa
(74) *Attorney, Agent, or Firm* — Jack Schwartz & Associates, PLLC

(57) ABSTRACT

A method for processing at least one peripheral image that when displayed extends beyond the borders of a displayed central image is disclosed. The method includes adapting luminance of the peripheral image to human vision characteristics when the luminance of peripheral images is processed so that the rendered light from the peripheral image in the viewer field of view remains low and close to the light rendered by the central view only. According to a first embodiment, the method includes adapting luminance of the peripheral image to a reference reflectance level by applying a light correction function to the input luminance when such light correction function is obtained by measuring a ren- (Continued)

dered luminance level of the displayed peripheral image adapted to the reference reflectance level of the surface where is displayed the peripheral image. According to a second embodiment, the luminance is further adapted to real reflectance with respect to reference reflectance. According to a third embodiment, the luminance of moving object in the peripheral image is increased.

22 Claims, 3 Drawing Sheets

(58) Field of Classification Search
USPC ....... 382/170, 171, 206, 209, 210, 219, 260, 382/261, 274, 275, 282; 345/611, 619, 345/647, 55, 102
See application file for complete search history.

(56) References Cited

U.S. PATENT DOCUMENTS

| | | | | |
|---|---|---|---|---|
| 6,952,195 | B2 * | 10/2005 | Arakawa | G09G 3/3406 345/102 |
| 7,609,360 | B2 * | 10/2009 | Yamaguchi | G09G 3/3406 349/1 |
| 7,639,849 | B2 * | 12/2009 | Kimpe | G09G 3/20 345/690 |
| 7,773,080 | B2 * | 8/2010 | Sato | G09G 3/20 345/212 |
| 7,791,656 | B2 * | 9/2010 | Katagiri | H04N 5/243 348/254 |
| 7,990,443 | B2 * | 8/2011 | Katagiri | H04N 5/243 348/235 |
| 8,248,454 | B2 * | 8/2012 | Thielman | G06F 3/1423 348/14.07 |
| 8,482,484 | B2 * | 7/2013 | Yamazaki | G09G 3/30 257/88 |
| 8,506,093 | B2 * | 8/2013 | Kato | G03B 21/53 353/101 |
| 8,537,144 | B2 * | 9/2013 | Matthijs | G09G 3/006 345/204 |
| 8,643,574 | B2 * | 2/2014 | Miyamoto | G09G 3/3233 250/200 |
| 8,648,794 | B2 * | 2/2014 | Nishida | G02F 1/1336 345/102 |
| 8,669,933 | B2 | 3/2014 | Kunimori et al. | |
| 2006/0007223 | A1 | 1/2006 | Parker | |
| 2011/0115979 | A1 | 5/2011 | Aoki et al. | |
| 2014/0146394 | A1 | 5/2014 | Tout et al. | |
| 2014/0267460 | A1 | 9/2014 | Bolas et al. | |

FOREIGN PATENT DOCUMENTS

| | | |
|---|---|---|
| WO | WO2004006570 | 1/2004 |
| WO | WO2006003600 | 1/2006 |

OTHER PUBLICATIONS

Jones et al., "IllumiRoom: Peripheral Projected Illusions for Interactive Experiences", ACM SIGCHI Conference on Human Factors in Computing Systems, Paris, France, Apr. 27, 2013, pp. 869-878.

Mills et al., "Surround Video", Network & Electronic Media Summit, Torino, Italy, Sep. 27, 2011, pp. 55-63.

Novy, D., "Computational Immersive Display", Master's Thesis, Media Arts and Sciences, School of Architecture and Planning, Massachusetts Institute of Technology, Jun. 2013, pp. 1-79.

Baudisch et al., "Focus Plus Context Screens: Combining Display Technology with Visualization Techniques", Proceedings of the 14th Annual ACM Symposium on User Interface Software and Technology, Orlando, Florida, USA, Nov. 11, 2001, pp. 31-41.

Wang et al., "Radiometric Compensation in a Projector-Camera System Based on the Properties of Human Vision System", IEEE Conference on Computer Vision and Pattern Recognition, San Diego, California, USA, Jun. 20, 2005, pp. 1-7.

Pinhanez, C. "The Everywhere Display Projector: A Device to Create Ubiquitous Graphical Interfaces", ACM Conference on Ubiquitous Computing, UBICOMP 2001, Atlanta, Georgia, USA, Sep. 30, 2001, pp. 315-331.

Raskar et al., "Shader Lamps: Animating Real Objects With Image-Based Illumination", Eurographics Workshop on Rendering, London, United Kingdom, Jun. 25, 2001, pp. 1-10.

Bimber et al., "Embedded Entertainment with Smart Projectors", Computer, vol. 38, No. 1, Jan. 2005, pp. 48-55.

Bimber et al., "Superimposing Dynamic Range", ACM Transactions on Graphics, vol. 27, No. 5, Article 150, Dec. 2008, pp. 1-8.

* cited by examiner

METHOD AND DEVICE FOR PROCESSING A PERIPHERAL IMAGE

This application claims the benefit, under 35 U.S.C. § 365 of International Application PCT/EP2016/054397, filed Mar. 2, 2016, which was published in accordance with PCT Article 21(2) on Sep. 22, 2016, in English, and which claims the benefit of European Patent Application No. 15290071.8 filed Mar. 13, 2015.

1. TECHNICAL FIELD

In the following, a device and a method for processing images are disclosed. In particular, a device and a method for processing at least one peripheral image that extends beyond the borders of a central image are disclosed.

2. BACKGROUND ART

This section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Today films are mostly produced for a central screen only. To improve user experience, additional content is projected around the television or cinema screen thus extending the original scene around the user. Such system by filling the viewers' field of vision enhances immersiveness of the user, i.e. it gives the user a better sense of being in the scene. Such content is for instance captured using wide field of view cameras, rig of cameras for 110 to 360 capture, or created using computer generated images.

However extending video content in a manner that is consistent with the original video and visually pleasing is difficult.

Among methods for extending video content, the first one is to capture additional content with a wide field of view. However such technique requires a lot of manual work at least because of the post-production need to manage more images (central and side images). Besides special care need to be taken for the extension which should not disturb nor create troubles for the viewer as it is designed to improve user experience.

A simple technology for extending video content is the technology Ambilight by Philips, disclosed in WO 2004/006570, which studies the distribution of colors in the central image and projects main colors of the image around the screen using RGB LEDs mounted on the edges of the TV. The light projection is only done around the TV in a limited area and provides no detail of background nor shape nor motion impression. However such extensions coherent with content in terms of color and light might not be optimal in case of high luminance image because such technology increases too much the ambient light. The extension should not disturb nor create troubles for the viewer as it is designed to improve user experience.

Another technology for extending video is the technique disclosed by A Aides et al. in "Multiscale ultrawide foveated video extrapolation" (in *IEEE International Conference on Computational Photography* (ICCP) 2011, pages 1-8). The key idea of the algorithm is to use a Patch-Match algorithm in space and time dimensions (using video cubes, instead of image blocks) to extrapolate the video outside of its borders. When choosing the right patch, the method penalizes patches that are likely to cause distraction. Besides, since human vision is less sensitive to details when it gets farther from the center of the eye, the algorithm is computed at different resolution. The best results are obtained when the extrapolation is done from the coarser resolution to the highest resolution. However with such techniques, the whole field of vision of a user may not be filled since the size of the extensions is limited. Besides, as for other computer generated images, the artistic intent might not be preserved. Indeed, the user might be distracted from the narrative by side images or modification of the viewing conditions that may be too attractive.

Thus even if extensions are desirable for immersiveness, extensions may not be suitable for a comfortable viewing experience, in particular when too much light is induced by the extended projections. A method for processing extended content so that user experience is improved is therefore needed.

3. SUMMARY

According the present principles, embodiments are described wherein the luminance of peripheral images is processed so that the light from the peripheral image in the viewer field of view remains low. In others words, the luminance of the peripheral view is decreased so that when views are displayed, the global luminance rendered by the central view and by the peripheral view(s) remains close to the luminance rendered only view of the central.

To that end, a method for processing at least one peripheral image that extends the borders of a central image is disclosed. The method comprises adapting luminance of the peripheral image based on human vision characteristics.

More specifically, according to a first embodiment, the method comprises adapting luminance of a peripheral image to a reference reflectance level by applying a light correction function to the luminance of the peripheral image wherein the light correction function is obtained by measuring a rendered luminance level of a displayed peripheral image adapted to the reference reflectance level of the surface where is displayed the peripheral image. According to a specific characteristic of the first embodiment, the light correction function is such that luminance is decreased in case the luminance of the peripheral image is above a high luminance threshold and luminance is not modified in case the luminance of said peripheral image is below a low luminance threshold. Advantageously, the low luminance threshold and the high luminance threshold respectively correspond to a low rendered luminance level and a high rendered luminance level of displayed peripheral images for increasing luminance of said peripheral image when displayed on said reference reflectance level. In other words, the thresholds are obtained by experiment wherein peripheral images with increasing luminance level are displayed.

Such embodiment is particularly well adapted in case where too much light is reflected by the peripheral projections so that the global light in the viewer field of view is higher than the original intent from the central view.

According to a variant of the first embodiment, adapting luminance of the peripheral image comprises applying a light correction function adapted to the reference reflectance level; and decreasing luminance of the peripheral image to adapt to global luminance level displayed. Such variant is particularly well adapted to modulate a light correction function obtained for a reference environment to a user environment or to a user preference. According to a specific characteristic, adapting luminance of said peripheral image further comprising applying a linear function depending of a reflectance level of the surface where is displayed the peripheral image with respect to the reference reflectance level.

Such variant is particularly well adapted in case where not enough light is reflected by the peripheral projections because of black lateral walls.

According to a second embodiment, the method comprises increasing the luminance of moving object in the peripheral image. Advantageously, such object-based adaptation increases the appearance of moving objects.

According to a second aspect, a device for processing at least one peripheral image that when displayed extends the borders of a displayed central image is disclosed. The device comprises at least one processor configured to adapt luminance of said peripheral image to a reference reflectance level by applying a light correction function to the luminance of the peripheral image wherein the light correction function is obtained by measuring a rendered luminance level of the displayed peripheral image adapted to the reference reflectance level of the surface where is displayed the peripheral image. According to another embodiment, a device for projecting video data on at least one screen wherein video data comprises a central image and at least one peripheral image is disclosed. The projecting device comprises at least one processor configured to adapt luminance of the peripheral image according to the present principles.

According to another embodiment, the device comprises means for adapt luminance of the peripheral image according to the present principles.

According to third aspect, a computer program product comprising program code instructions to execute of the steps of the processing method according to any of the embodiments and variants disclosed when this program is executed on a computer.

A processor readable medium having stored therein instructions for causing a processor to perform at least the steps of the processing method according to any of the embodiments and variants disclosed.

According to a fourth aspect, a non-transitory program storage device is disclosed that is readable by a computer, tangibly embodies a program of instructions executable by the computer to perform the processing method according to any of the embodiments and variants disclosed.

While not explicitly described, the present embodiments may be employed in any combination or sub-combination. Besides, any characteristic or embodiment described for the processing method is compatible with a device intended to process the disclosed method and with a computer-readable storage medium storing program instructions.

4. BRIEF DESCRIPTION OF THE DRAWINGS

In the drawings, an embodiment of the present principles is illustrated. It shows:

5. DESCRIPTION OF EMBODIMENTS

Figure 1:
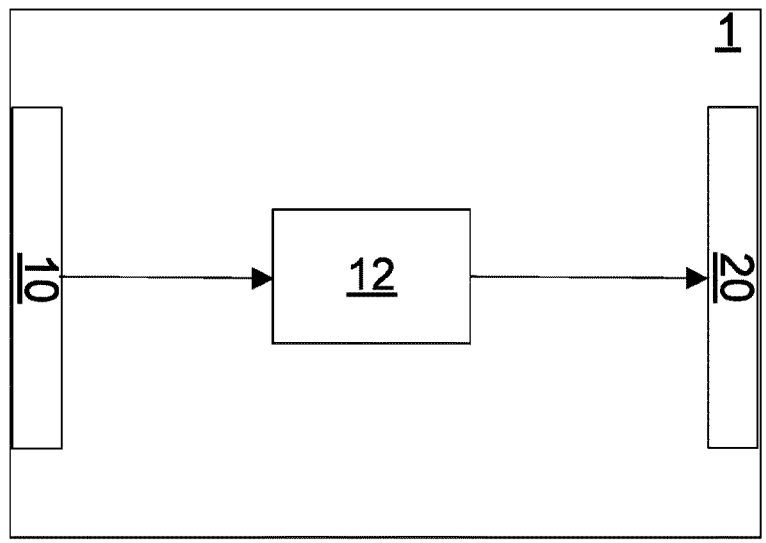
FIG. 1 depicts a processing device according to an embodiment of the present principles.

FIG. 1 depicts a processing device 1 for adapting the luminance of at least one peripheral image that extends beyond the borders of a central image according to an embodiment of the present principles. A video content is extended to surround the screen in particular for theater, home cinema or head mounted (HMD) devices using a wide field of vision. Those kinds of display are known as immersive displays. For instance, to extend the video content to surround the screen, the content is extrapolated in order to create peripheral (or side) projections. This can be done by using appropriate image processing techniques to extrapolate from original central content. However, the peripheral content may be obtained from a camera with large field of view. Accordingly, the processing device 1 comprises an input 10 configured to receive at least one peripheral video. The peripheral video may be obtained from a source. According to different embodiments of the present principles, the source belongs to a set comprising:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an picture capturing circuit (e.g. a sensor such as, for example, a CCD (or Charge-Coupled Device) or CMOS (or Complementary Metal-Oxide-Semiconductor)).

The input 10 is linked to a module 12 configured to adapt the luminance of the at least one peripheral video responsive to human vision characteristics. The adapted extrapolated videos can be stored in a memory or can be sent to a destination. As an example, such information is stored in a remote or in a local memory, e.g. a video memory or a RAM, a hard disk. In a variant, the information is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network. In a variant, the processing device 1 further comprises a module for extrapolating surround videos.

Figure 2:
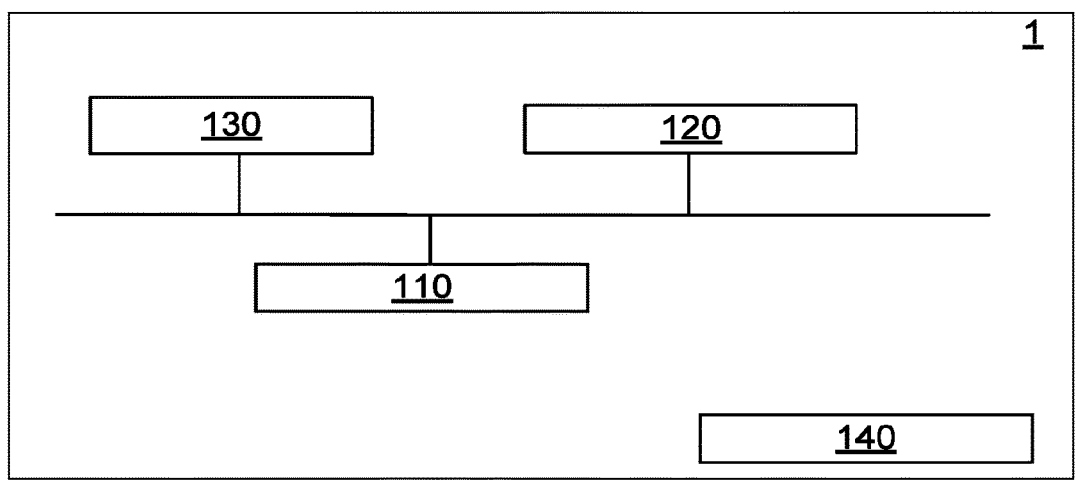
FIG. 2 represents an exemplary architecture of the processing device of FIG. 1 according to an embodiment of the present principles.

FIG. 2 represents an exemplary architecture of the processing device 1 according to an exemplary embodiment of the present principles. The processing device 1 comprises one or more processor(s) 110, which is(are), for example, a CPU, a GPU and/or a DSP (English acronym of Digital Signal Processor), along with internal memory 120 (e.g. RAM, ROM, EPROM). The processing device 1 comprises one or several Input/Output interface(s) 130 adapted to display output information and/or allow a user to enter commands and/or data (e.g. a keyboard, a mouse, a touchpad, a webcam, a display); and a power source 140 which may be external to the processing device 1. The processing device 1 may also comprise network interface(s) (not shown).

According to an exemplary and non-limitative embodiment of the present principles, the processing device 1 further comprises a computer program stored in the memory 120. The computer program comprises instructions which, when executed by the processing device 1, in particular by the processor 110, make the processing device 1 carry out the processing method described with reference to FIG. 5. According to a variant, the computer program is stored externally to the processing device 1 on a non-transitory digital data support, e.g. on an external storage medium such as a HDD, CD-ROM, DVD, a read-only and/or DVD drive and/or a DVD Read/Write drive, all known in the art. The processing device 1 thus comprises an interface to read the computer program. Further, the processing device 1 could access one or more Universal Serial Bus (USB)-type storage devices (e.g., "memory sticks.") through corresponding USB ports (not shown).

According to exemplary and non-limitative embodiments, the processing device 1 is a device, which belongs to a set comprising:
- a mobile device;
- a communication device;
- a game device;
- a tablet (or tablet computer);
- a laptop;
- a still picture camera;
- a video camera;
- an encoding chip;
- a decoding chip;
- a still picture server;
- a video server (e.g. a broadcast server, a video-on-demand server or a web server);
- a projecting device or projector;
- a theater projector;
- a home cinema display; and
- a head mounted device (HMD).

Figure 3:
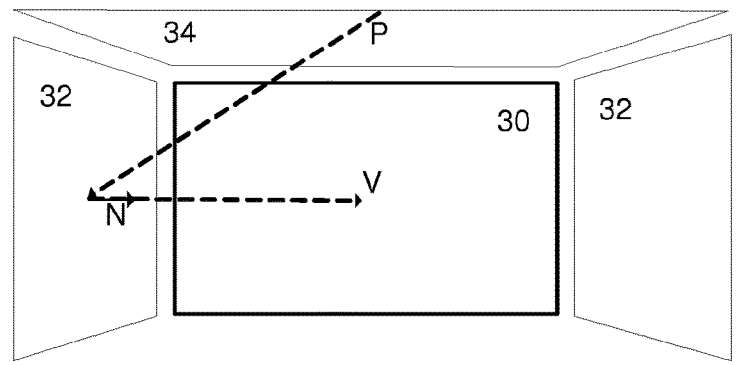
FIG. 3 shows an exemplary arrangement for displaying extrapolated images.

FIG. 3 shows an exemplary arrangement for displaying such peripheral images. The main image from the film or video content is displayed on a central screen 30, while the peripheral images are displayed beyond the borders of the central screen 30 on display areas 32 and/or 34 to provide the feeling of immersiveness. Such arrangement for instance may exist in a theater, where a center projector projects the film or video content onto a center display screen, while a left projector projects a first extrapolated image onto the left display screen, a right projector projects a second extrapolated image onto the right display screen and optionally, a projector may also be provided for an above display screen. A variant of the arrangement comprises a single projector P including 3 optics so as to project an image in 3 different directions. Such arrangement also may exist as projector based home cinemas or HMD. However, the present principles are not limited to image projection but are compatible with any kind of image display. For instance, peripheral image are displayed on panels of a HMD.

Figure 4:
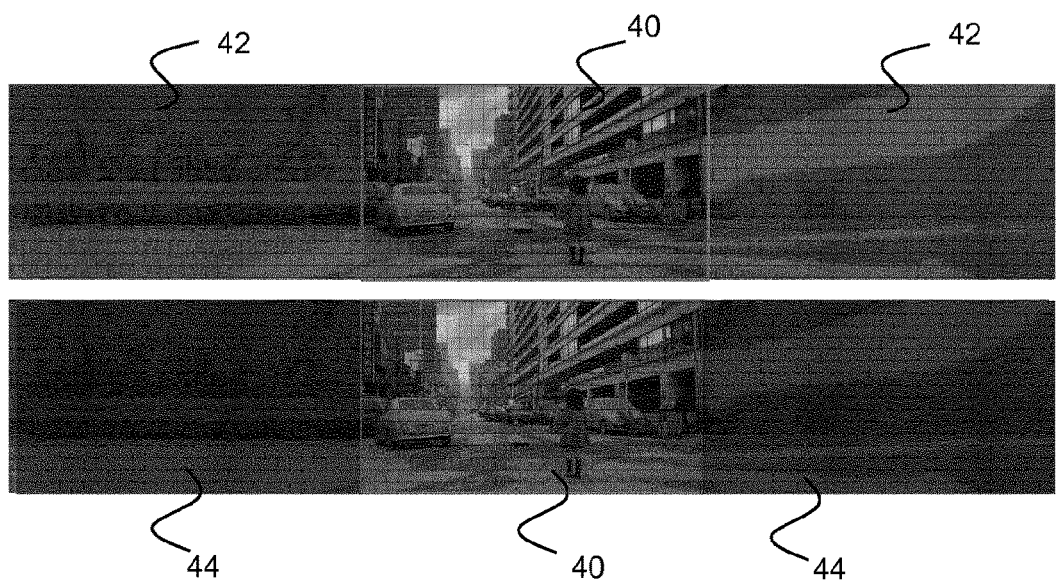
FIG. 4 illustrates an exemplary image including a central image and extrapolated images generated and displayed beyond the left and right borders of the central image before and after luminance adaptation.

FIG. 4 illustrates an exemplary image including a central image 40 and extrapolated images 42, 44 generated and displayed beyond the left and right borders of the central image. It can be seen that the enhanced extrapolated image 44 have a lower luminance than extrapolated image 42 in a manner to preserve the visual experience of the original image 40 which already exhibits a high light level. Indeed, the enhanced extrapolated images shows reduced high light levels compared to central image while they keep the low levels as they are, in order to not loose information in darks scenes. A high luminance level is when the luminance level of a pixel of the peripheral image exceeds a high threshold luminance level while a low luminance level is when the luminance level of a pixel of the peripheral image is below a low threshold luminance level. For instance, the luminance of image pixel is represented by a grayscale level quantized to 8 bits, hence between [0-255], the low threshold luminance is 40 and the high threshold luminance is 200.

Figure 5:
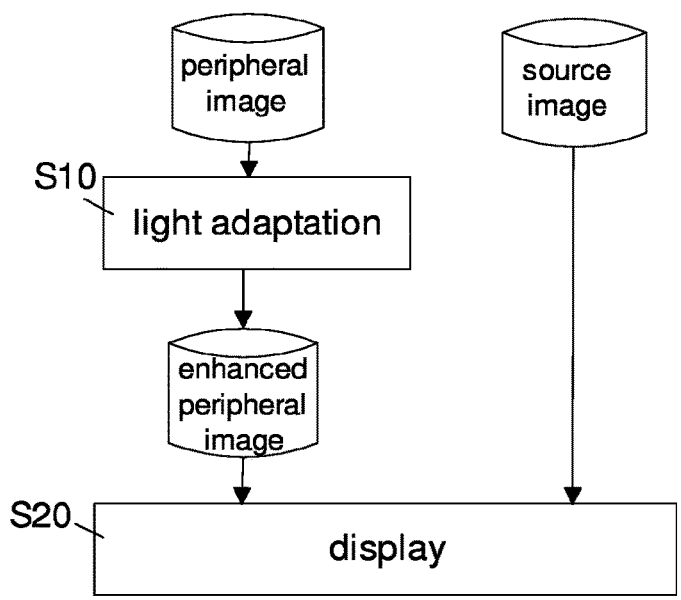
FIG. 5 represents a flowchart of a method for displaying multiple videos according to an embodiment of the present principles.

FIG. 5 represents a flowchart of a method for processing at least one peripheral image that extends beyond the borders of a central image according to a specific and non-limitative embodiment of the present principles.

The embodiments are disclosed in a non-limitative way for an image of a video, such image corresponding to a time t of a video. However, the present principles are not limited to the processing of a single peripheral image but the processing is iteratively applied to process the whole video. Besides, the method may be repeatedly applied to each pixel of a peripheral image, sequentially or in parallel, to obtain the enhanced peripheral image. According to a first variant adapted in the case where the surface on which the peripheral is smooth, the adaptation is global, the same processing is applied to each pixel. According to second variant adapted in the case where the surface is not uniform or in the case where the peripheral image contains object in movement to highlight, the adaptation is local, the processing may varies according to the pixel localization.

In a step S10, the luminance of the peripheral image is adapted to characteristics of human vision to enhance immersive experience. To that end, a light correction function is iteratively applied to peripheral images from each of central images, wherein the sequence of images forms an original video or film, so as to output enhanced peripheral images. Advantageously the correction function is applied to each of the peripheral images (left, right, above . . . ).

Then in a supplementary step S20, central images and enhanced peripheral images are displayed according to an arrangement as described in FIG. 3.

At least 3 embodiments are now described that disclose variants of light correction function that enhances immersive experience of a viewer.

According to a first embodiment, adapting luminance of peripheral image comprises decreasing luminance level of the peripheral image in case of a high luminance level of the peripheral image. According to another particular characteristic of the first embodiment, adapting luminance of peripheral image comprises not modifying the luminance level in case of low luminance level of the peripheral image. Advantageously in such embodiment, light adaptation by keeping the low and middle luminance levels preserve some contrast while by limiting the high luminance levels light adaptation reduces the peripheral and global ambient light.

In a variant of the first embodiment, adapting luminance of peripheral image comprises increasing the luminance level of the peripheral image in case of a high luminance level of the peripheral image. Advantageously such embodiment is adapted in case of black lateral wall reflecting low light. The skilled in the art will understand, that such embodiment is also adapted to any color or material of the surface where is displayed the peripheral image which modifies the reflectance with respect to the reference reflectance level.

According to another particular characteristic of the first embodiment, a non-linear light correction function is disclosed. The non-linear light correction function decreases luminance level in case of high luminance level of the peripheral image and does not modified the luminance level in case of low luminance level of the peripheral image.

As those skilled in the art know, the human peripheral vision, mainly based on the rods photoreceptors, is more sensitive to low to medium light and motion, and less to colors and resolution. The vision of the eye under low light conditions is called scotopic vision. Scotopic vision occurs at luminance levels of $10^{-3.5}$ to $10^{-6}$ cd/m². Advantageously, the light correction function adapts peripheral projected images/video to human vision sensibility.

Figure 6:
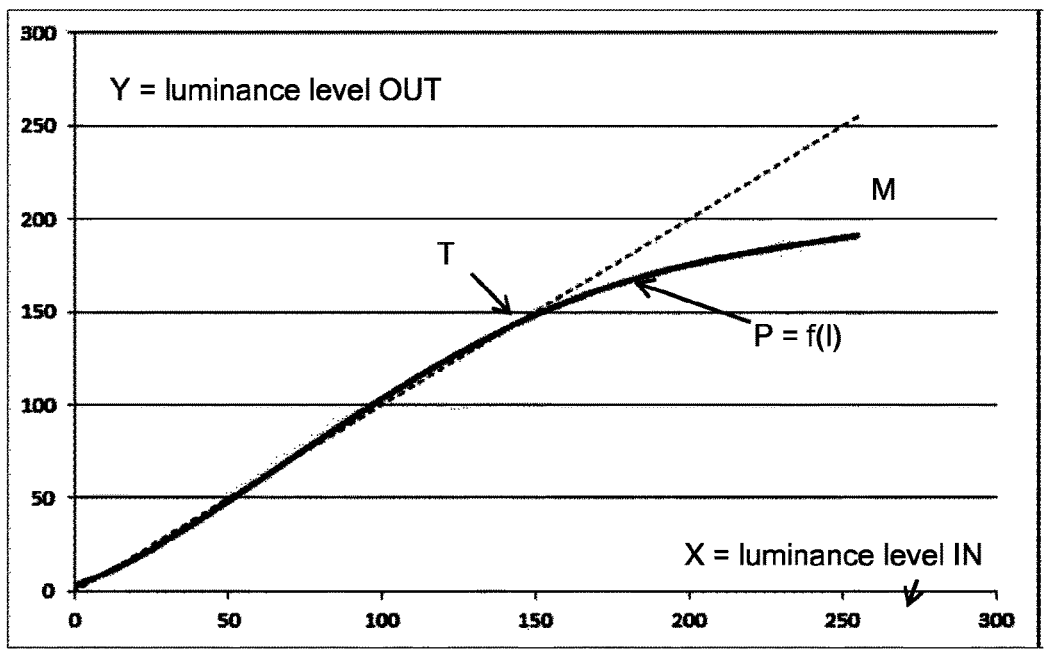
FIG. 6 represents an interpretation of the transform through space quantization to obtain a relative positioning of two images according to an embodiment of the present principles.

In a non-limitative embodiment, a non-linear light correction function is disclosed that is responsive to subjective viewer experiments. In the experiment, a central view with homogeneous luminance level is projected, while the luminance of peripheral images is increased up so that the viewer perceived it or is annoyed by the peripheral images. Such experiment leads to the determination of perception or rendered thresholds P (output luminance) for each value of the peripheral image light I (input luminance). The results are illustrated on FIG. 6 where luminance levels in 8 bits grayscale are normalized to [0-255]. The input luminance levels are represented on the X axis and the output luminance levels of perception thresholds are represented on the Y axis. Those perception thresholds P are quasi-linear for low luminance values, ie under a threshold T of 150, while for high value, ie above the threshold T of 150, they reach a maximum value M around 200, as shown in FIG. 6. Such transfer function from input luminance to output luminance is modeled according to the formula:

$$L(t)=aI(t)^4+bI(t)^3+cI(t)^2+dI(t)+e$$

where L(t) is the final luminance value of a pixel in the enhanced peripheral image corresponding to time t;

I(t) is the original luminance value of the same pixel in the peripheral image at same time t;

and a, b, c, d and e are coefficients obtained from the experimental results with $a=8.10^{-8}$, $b=5.10^{-5}$, $c=0.008$, $d=0.6225$, $e=3.0312$.

According to a particular characteristic, the coefficients no not depend on the pixel localization in the peripheral image and the same non-linear light correction function is applied to each pixel.

However, the present principles are not limited to the above function and any linear or non-linear functions modeling the experimental results are compatible with the first embodiment. Besides, the present principles are not limited to the above experimental results as experimental results depend on the viewer environment. Thus as previously explained the non-linear function could increase the luminance level of the peripheral image even in case of a high luminance level of the peripheral image in case of black lateral wall with low reflecting reflectance.

According to a second embodiment, a linear light correction function is disclosed. The linear light correction function decreases luminance level of the peripheral image in case of a high reflectance level of the surface (for instance a white screen) where is displayed the peripheral image. On the contrary, the linear light correction function increases luminance level of the peripheral image in case of a low reflectance level of the surface (for instance a black screen) where is displayed the peripheral image. Indeed, the linear function is responsive to the reflectance level of a surface where is projected the peripheral image. In a refinement, a light correction function is determined for a standard or reference reflectance level and such linear correction function is then applied to the (input) luminance to further adapt the luminance to the real reflectance level.

The bidirectional reflectance distribution function, noted BRDF, is a four-dimensional function that defines how light is reflected at an opaque surface. The BRDF returns the ratio of reflected radiance $L^{surface}$ exiting along a direction to the irradiance $E^{surface}$ incident on the surface from another direction. Thus, the local amount of light that is reflected by a non-homogenous peripheral screen in function of the incident light (irradiance) and of the surface properties (radiance) is modeled as:

$E^{surface}(\theta_i, \phi_i)$ Irradiance at Surface in direction $(\theta_i, \phi_i)$ $L^{surface}(\theta_r, \phi_r)$ Radiance of Surface in direction $(\theta_r, \phi_r)$ $$\boxed{BRDF: f(\theta_i, \phi_i; \theta_r, \phi_r) = \frac{L^{surface}(\theta_r, \phi_r)}{E^{surface}(\theta_i, \phi_i)}}$$

Where $(\theta_i, \phi_i)$ is the angle representing the incoming incident light L, direction defined with respect to the surface normal, $(\theta_r, \phi_r)$ is the angle representing the outgoing light direction L, toward the viewer defined with respect to the surface normal.

The BRDF has units sr⁻, with steradians (sr) being a unit of solid angle.

In case of diffuse reflection, the radiance $L^{surface}$ is given by:

$$L^{surface} = \frac{\rho_d}{\pi} \cdot I \cdot \cos\theta_i$$

$\theta_i$ being the normal angle with the incident light source with intensity I;

and $\rho_d$ the albedo or reflection coefficient of the surface which represents the diffuse reflectivity or reflecting power of a surface.

Thus knowing the surface radiance L, a light attenuation coefficient $\propto$ is determined for the peripheral image luminance that is function of the surface radiance L and of source intensity I, assuming the viewer V is at a position normal N to a lateral wall, and the projector P at the back of the theater as represented on FIG. 3:

$$\propto = \frac{L}{I}$$

According to a first variant, the surface radiance L is measured for instance by projecting a white image of known intensity I (or more generally for determined light pattern) and capturing the reflected light with a sensor such as, for example, a CCD (or Charge-Coupled Device) or CMOS (or Complementary Metal-Oxide-Semiconductor)). The experimental result thus allows estimating $\propto$ by measuring L and I. In such variant, a calibration phase is performed in the theater with projected patterns and manual adjustment. According to this variant, a pixel wise surface radiance may be measured thus allowing a pixel wise adaptation of the luminance.

The linear light correction function is therefore modeled by the following formula:

$$L_\alpha(t)=\alpha \cdot I(t)$$

where $L_\alpha(t)$ is the final luminance value of a pixel in the enhanced peripheral image corresponding to time t;

I(t) is the original luminance value of the same pixel in the peripheral image at same time t.

According to a second variant, the computation of the coefficient ∝ is simplified by assuming the surface reflectance is known through its albedo ρd for instance by assuming a lateral wall (i.e the surface on which is projected the image) is made of concrete recovered with a black tapestry or on the contrary by assuming a lateral wall is a white screen (for indication, black acrylic paint ρd=0.05, white acrylic paint ρd=0.8). Thus only the angle $\theta_t$ from the source P on FIG. 3 to the normal N of the surface needs to be known.

$$\propto = \frac{\rho_d}{\pi} \cdot \cos\theta_i$$

While not explicitly described, the present embodiments may be employed in any combination or sub-combination. For example, the present principles are not limited to the described linear light correction function responsive to the lateral screen reflectance but might be combined with the above weight function or a non-linear function. The skilled in the art will thus notice that in case of a low reflectance of a lateral wall, the combined luminance (resulting from the non-linear variant characterized by some viewing conditions and the linear variant parametrized for low reflectance) may be increased compared to the input luminance even in case of high input luminance.

According to a third embodiment, another weight light correction function is disclosed. The weight light correction function increases the luminance level in case of moving object in the peripheral image. Advantageously, such function allows highlighting some moving objects for the lateral views to enhance immersiveness. As previously detailed, the human peripheral vision has a higher sensibility to motion. Those skilled in the art will notice that, in a first variant, such processing is done at the generation of the extrapolated images by increasing the contrast of those moving objects. In a second variant, such processing is performed jointly with the luminance adaptation disclosed in the previous embodiments.

In that case the final luminance value is weighted by a coefficient β whose value depends on the "interest" of the object. A value of $\beta_{(i,j)}$ is defined per pixel (represented by its coordinates (i,j)) of the extrapolated image. β is computed based on the motion M(t) and salience S(t) of the considered pixel/object at the time t for instance.

Then (t)=$\beta_{(i,j)}$(M(t), S(t))·I(t)

Where (i,j) are the coordinates of the pixel;

(t) is the final luminance value of the pixel (i,j) in the enhanced peripheral image corresponding to time t and;

I(t) is original luminance value of the same pixel in the peripheral image at same time t.

This embodiment is particularly adapted in case where an object crosses the central video. While extension computation avoids putting distracting content in the periphery, objects coming into or out of the image to sometimes disappear when they reach the peripheral image. To correct this issue, objects are detected and tracked in the main content and then pasted in peripheral videos according to their computed motion and with an additional blur to fit the peripheral vision.

According to a particular characteristic, the function is applied in a dynamic way to account for temporal changes for instance for smoothing light image in case of scene change.

Advantageously, the method is iterative and the light adaptation described for at least a peripheral image is applied to each peripheral image of the extrapolated video.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for processing at least one peripheral image, said at least one peripheral image being displayed on a surface that extends beyond borders of a central image displayed on a screen, said at least one peripheral image corresponding to an extension of said central image, the method comprising:
    obtaining information representative of a reflectance level of said surface; and
    adapting a luminance of said at least one peripheral image according to said information representative of a reflectance level by applying a light correction function to the luminance of said at least one peripheral image, the correction function being such that for at least a pixel of said at least one peripheral image, a first luminance level of said pixel when displayed on a first surface having a first reflectance level is lower than a second luminance level of said pixel when displayed on a second surface having a second reflectance level, the first reflectance level being higher than the second reflectance level.

2. The method according to claim 1, wherein said information is obtained by capturing a reflection of a light projected with a determined intensity on said surface.

3. The method according to claim 1, wherein said information is obtained according to an albedo of said surface and a value of an angle between a projector projecting said at least one peripheral image and a normal to said surface.

4. The method according to claim 1, wherein said light correction function decreases luminance of said peripheral image when said luminance of said at least one peripheral image is above a high luminance value and maintains luminance of said peripheral image when said luminance of said at least one peripheral image is below a low luminance value.

5. The method according to claim 4, wherein said low luminance value and high luminance value respectively correspond to a low rendered luminance level and a high rendered luminance level of said displayed at least one peripheral image for increasing luminance of said at least one peripheral image when displayed at a reference reflectance level.

6. The method according to claim 1, wherein adapting luminance of said peripheral image comprises
    applying a light correction function adapted to a reference reflectance level; and
    decreasing luminance of said peripheral image to adapt to a global luminance level.

7. The method according to claim 1, wherein adapting luminance of said at least one peripheral image comprises increasing a luminance of a moving object in the at least one peripheral image.

8. A device for processing at least one peripheral image, said at least one peripheral image being displayed on a surface that extends beyond borders of a central image displayed on a screen, said at least one peripheral image corresponding to an extension of said central image, the device comprising a memory associated with a processor configured to:
    obtain information representative of a reflectance level of said surface; and
    adapt a luminance of said at least one peripheral image according to said information representative of a reflectance level by applying a light correction function to a luminance of said at least one peripheral image, the correction function being such that for at least a pixel of said at least one peripheral image, a first luminance level of said pixel when displayed on a first surface having a first reflectance level is lower than a second luminance level of said pixel when displayed on a second surface having a second reflectance level, the first reflectance level being higher than the second reflectance level.

9. The device according to claim 8, wherein said information is obtained by capturing a reflection of a light projected with a determined intensity on said surface.

10. The device according to claim 8, wherein said information is obtained according to an albedo of said surface and a value of an angle between a projector projecting said at least one peripheral image and a normal to said surface.

11. The device according to claim 8, wherein said device belongs to a system comprising a video projecting device.

12. The device according to claim 8, wherein the processor is further configured to increase a luminance of a moving object in the at least one peripheral image.

13. The device according to claim 8, wherein said light correction function decreases luminance of said peripheral image when said luminance of said at least one peripheral image is above a high luminance value and maintains luminance of said peripheral image when said luminance of said at least one peripheral image is below a low luminance value.

14. The device according to claim 13, wherein said low luminance value and high luminance value respectively correspond to a low rendered luminance level and a high rendered luminance level of said displayed at least one peripheral image for increasing luminance of said at least one peripheral image when displayed at a reference reflectance level.

15. The device according to claim 8, wherein the processor is further configured:
    to apply a light correction function adapted to a reference reflectance level; and
    to decrease luminance of said peripheral image to adapt to a global luminance level, for adapting luminance of said peripheral image.

16. A non-transitory processor readable medium having stored therein instructions for processing at least one peripheral image, said at least one peripheral image being displayed on a surface that extends beyond borders of a central image displayed on a screen, said at least one peripheral image corresponding to an extension of said central image, said instructions causing a processor to obtain information representative of a reflectance level of a surface; and adapt a luminance of said at least one peripheral image according to said information representative of a reflectance level by applying a light correction function to a luminance of said at least one peripheral image, the correction function being such that for at least a pixel of said at least one peripheral image, a first luminance level of said pixel when displayed on a first surface having a first reflectance level is lower than a second luminance level of said pixel when displayed on a second surface having a second reflectance level, the first reflectance level being higher than the second reflectance level.

17. The non-transitory processor readable medium of claim 16, wherein said information is obtained by capturing a reflection of a light projected with a determined intensity on said surface.

18. The non-transitory processor readable medium of claim 16, wherein said information is obtained according to an albedo of said surface and a value of an angle between a projector projecting said at least one peripheral image and a normal to said surface.

19. The non-transitory processor readable medium of claim 16, wherein said light correction function decreases luminance of said peripheral image when said luminance of said at least one peripheral image is above a high luminance value and maintains luminance of said peripheral image when said luminance of said at least one peripheral image is below a low luminance value.

20. The non-transitory processor readable medium of claim 19, wherein said low luminance value and high luminance value respectively correspond to a low rendered luminance level and a high rendered luminance level of said displayed at least one peripheral image for increasing luminance of said at least one peripheral image when displayed at a reference reflectance level.

21. The non-transitory processor readable medium of claim 16, wherein adapting luminance of said peripheral image comprises applying a light correction function adapted to a reference reflectance level; and decreasing luminance of said peripheral image to adapt to a global luminance level.

22. The non-transitory processor readable medium of claim 16, wherein adapting luminance of said at least one peripheral image comprises increasing a luminance of a moving object in the at least one peripheral image.

* * * * *